United States Patent
Mason

(10) Patent No.: US 9,308,413 B2
(45) Date of Patent: Apr. 12, 2016

(54) ATHLETIC TRAINING DEVICE

(71) Applicant: Jason C. Mason, Revere, MA (US)

(72) Inventor: Jason C. Mason, Revere, MA (US)

(*) Notice: Subject to any disclaimer, the term of this patent is extended or adjusted under 35 U.S.C. 154(b) by 185 days.

(21) Appl. No.: 14/016,349

(22) Filed: Sep. 3, 2013

(65) Prior Publication Data

US 2014/0323276 A1    Oct. 30, 2014

Related U.S. Application Data

(60) Provisional application No. 61/816,976, filed on Apr. 29, 2013.

(51) Int. Cl.
| | | |
|---|---|---|
| A63B 21/00 | (2006.01) | |
| A63B 71/00 | (2006.01) | |
| A63B 23/035 | (2006.01) | |
| A63B 23/12 | (2006.01) | |
| A63B 23/04 | (2006.01) | |

(52) U.S. Cl.
CPC ......... *A63B 21/1469* (2013.01); *A63B 21/0628* (2015.10); *A63B 21/4035* (2015.10); *A63B 21/4039* (2015.10); *A63B 21/4043* (2015.10); *A63B 23/03525* (2013.01); *A63B 23/1209* (2013.01); *A63B 2023/0411* (2013.01); *A63B 2244/12* (2013.01)

(58) Field of Classification Search
CPC ........... A63B 21/1469; A63B 21/1465; A63B 14/1453; A63B 21/14; A63B 21/00; A63B 21/02; A63B 21/055; A63B 21/0555; A63B 21/0552; A63B 21/0557; A63B 69/00
USPC .............. 482/23, 92, 121–126, 129, 139, 148
See application file for complete search history.

(56) References Cited

U.S. PATENT DOCUMENTS

| | | | | | |
|---|---|---|---|---|---|
| 2,782,033 | A * | 2/1957 | Ugartechea | ............ | A63B 21/04 482/129 |
| 3,384,370 | A * | 5/1968 | Bailey | ................ | A63B 21/0724 482/106 |
| 4,549,733 | A * | 10/1985 | Salyer | .................... | A63B 21/06 482/103 |
| 4,596,387 | A * | 6/1986 | Roberts | .............. | A63B 21/4017 24/68 SK |
| 4,629,184 | A * | 12/1986 | Selkee | ................ | A63B 21/0724 482/106 |
| 4,728,103 | A * | 3/1988 | Fulton | .................. | A63B 23/085 482/125 |
| 4,749,188 | A * | 6/1988 | Montgomery | ..... | A63B 21/0602 482/106 |
| 4,822,035 | A * | 4/1989 | Jennings | ............ | A63B 21/0724 482/106 |
| D303,697 | S * | 9/1989 | Pearson | ........................ | D21/682 |
| 4,940,227 | A * | 7/1990 | Coffey | ............... | A63B 22/0076 482/73 |
| 5,024,434 | A * | 6/1991 | Smith | ................ | A63B 21/0724 482/106 |
| 5,080,349 | A * | 1/1992 | Vittone | .................. | A63B 23/14 482/106 |
| 5,098,361 | A * | 3/1992 | Danylieko | ......... | A63B 21/0615 482/106 |
| 5,334,113 | A * | 8/1994 | Roepke | .............. | A63B 21/0724 482/106 |
| 5,381,650 | A * | 1/1995 | Garrett | .................... | F16G 15/08 403/78 |

(Continued)

*Primary Examiner* — Stephen Crow
*Assistant Examiner* — Garrett Atkinson
(74) *Attorney, Agent, or Firm* — Onello & Mello, LLP

(57) ABSTRACT

A training device that includes a base member having opposed sides that are for grasping by the hands of a user, a cross bar supported over the base member, a support post mounted from the base member at a lower end of the support post and for supporting the cross bar at an upper end of the support post, and a pair of cables separately attached at opposite ends of the cross bar.

16 Claims, 14 Drawing Sheets

(56) References Cited

U.S. PATENT DOCUMENTS

| | | | | |
|---|---|---|---|---|
| 5,399,133 A * | 3/1995 | Haber | ............... | A63B 21/4001 |
| | | | | 482/115 |
| 5,490,823 A | 2/1996 | Awbrey et al. | | |
| 5,624,362 A * | 4/1997 | Wilson | ................... | A63B 21/06 |
| | | | | 482/102 |
| 5,709,637 A * | 1/1998 | Gow | ...................... | A63B 23/12 |
| | | | | 482/121 |
| 5,718,654 A * | 2/1998 | Kennedy | .............. | A63B 21/154 |
| | | | | 482/102 |
| 6,283,897 B1 | 9/2001 | Patton | | |
| 7,056,268 B2 * | 6/2006 | Emick | ................ | A63B 21/0724 |
| | | | | 482/106 |
| 7,819,789 B2 * | 10/2010 | Berman | ............. | A63B 21/0004 |
| | | | | 482/121 |
| 7,862,486 B1 * | 1/2011 | Watson | .............. | A63B 21/0724 |
| | | | | 482/106 |
| 8,047,973 B2 * | 11/2011 | Berenshteyn | ...... | A63B 21/0724 |
| | | | | 482/100 |
| 2002/0198081 A1 * | 12/2002 | Chen | .................. | A63B 21/0004 |
| | | | | 482/23 |
| 2005/0043150 A1 | 2/2005 | Nitta et al. | | |
| 2006/0265910 A1 * | 11/2006 | Lampley | ................. | A43B 5/00 |
| | | | | 36/132 |
| 2007/0060454 A1 | 3/2007 | Vogel | | |
| 2010/0050473 A1 | 3/2010 | Rosso | | |
| 2010/0323852 A1 * | 12/2010 | Locsin | ..................... | A63B 1/00 |
| | | | | 482/96 |
| 2011/0256986 A1 * | 10/2011 | Forzato | ............. | A63B 21/0552 |
| | | | | 482/46 |
| 2011/0269604 A1 | 11/2011 | Tseng | | |

* cited by examiner

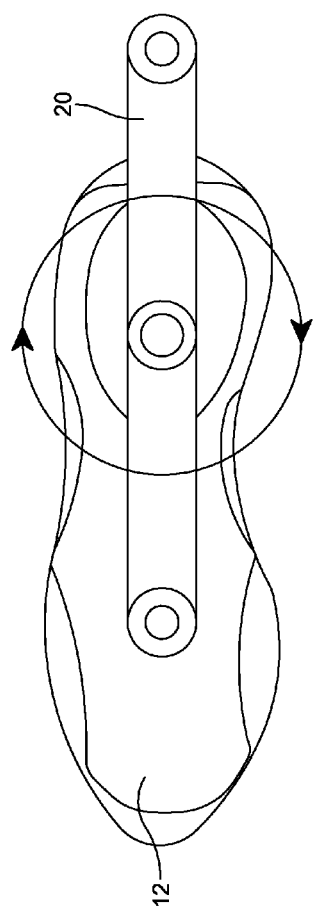
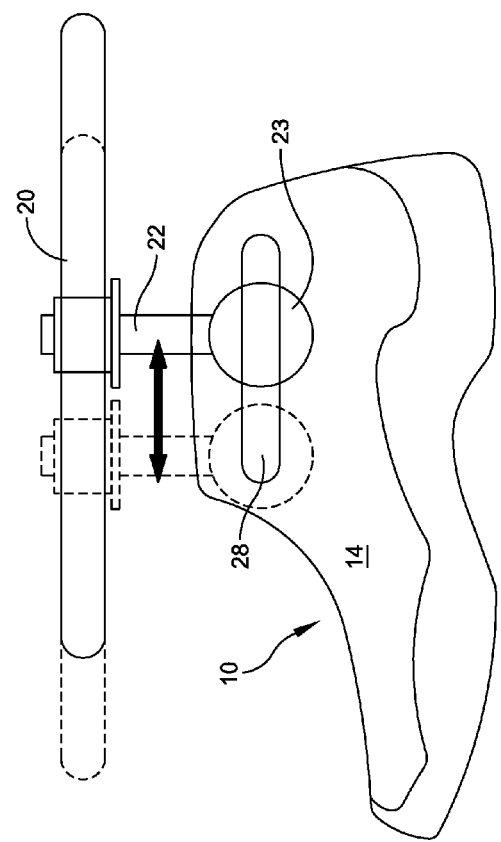

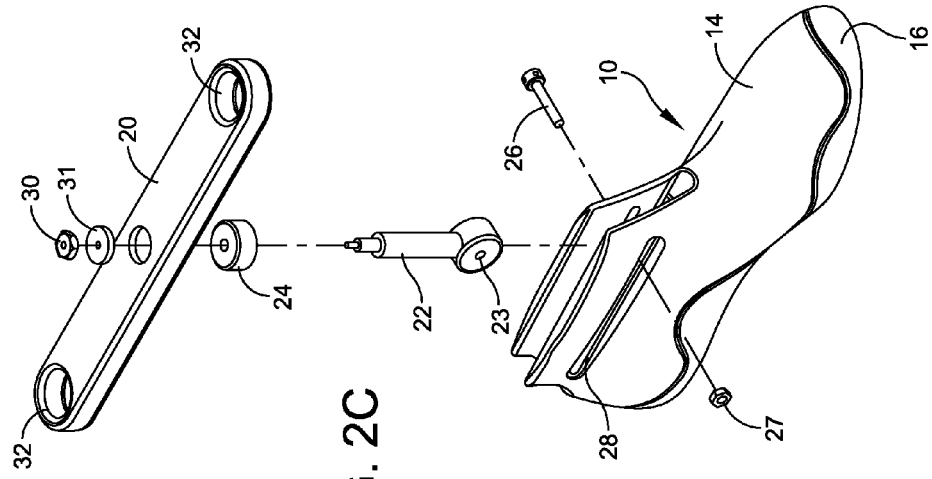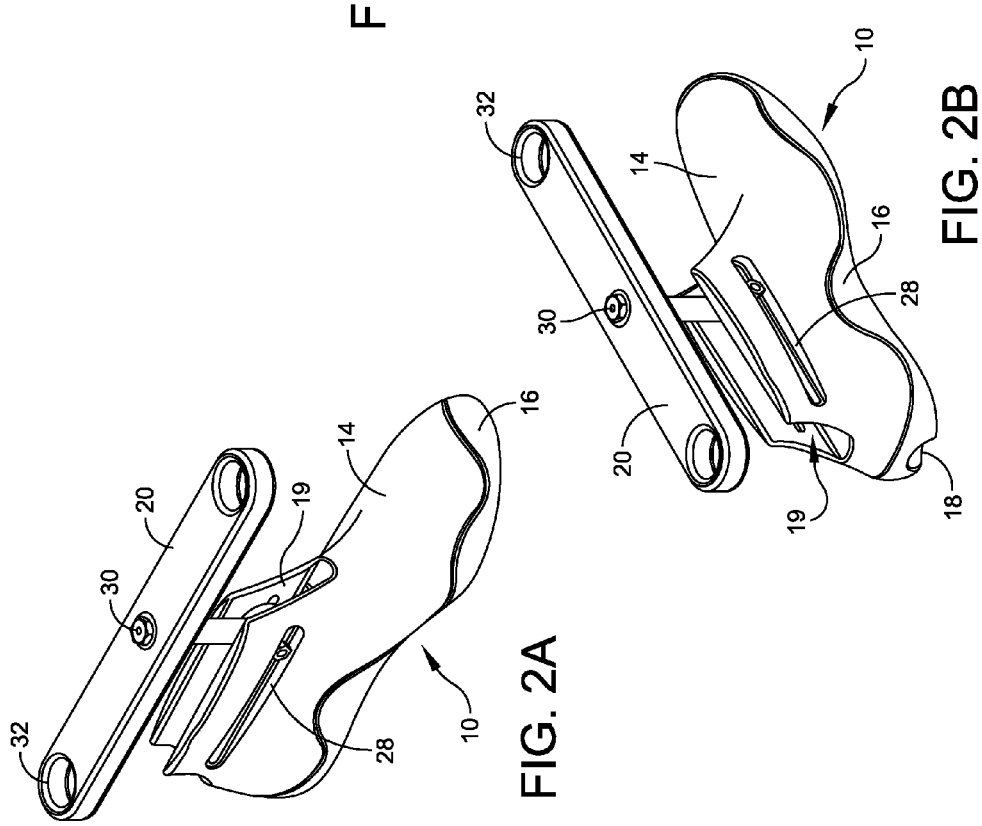

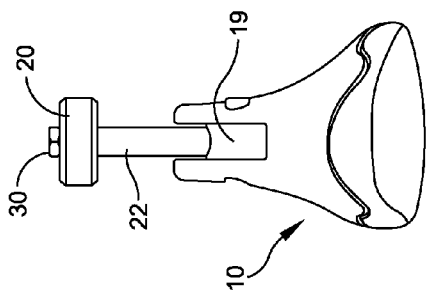
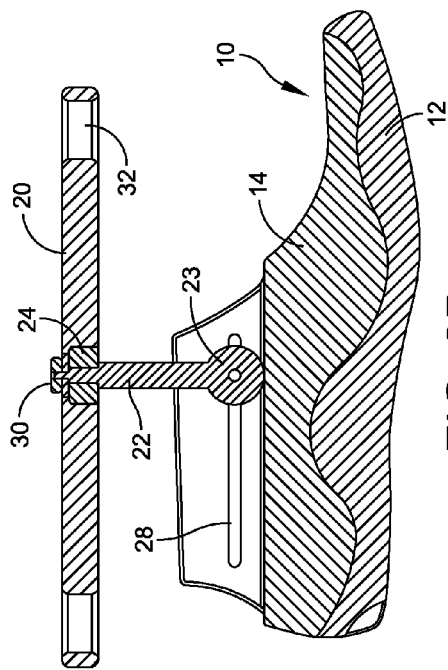
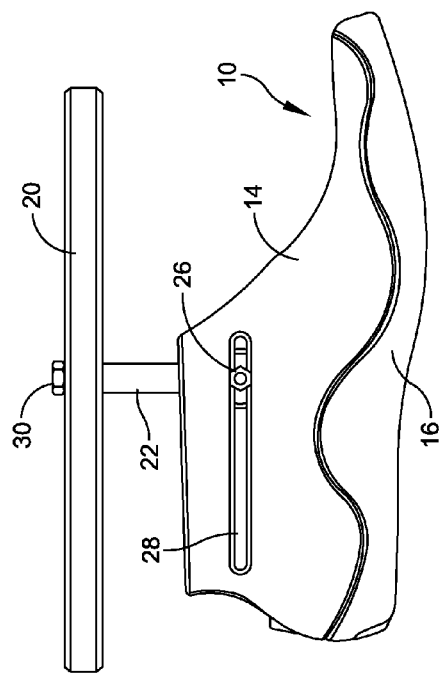
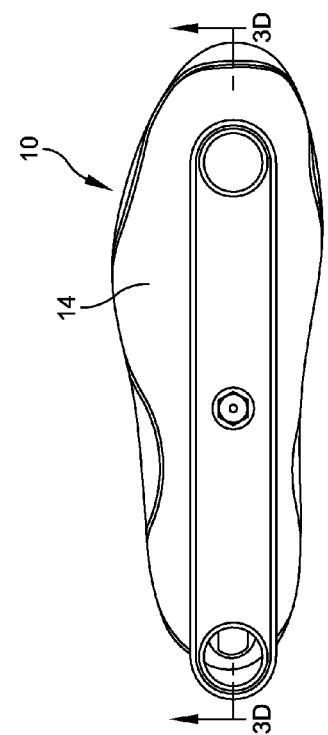

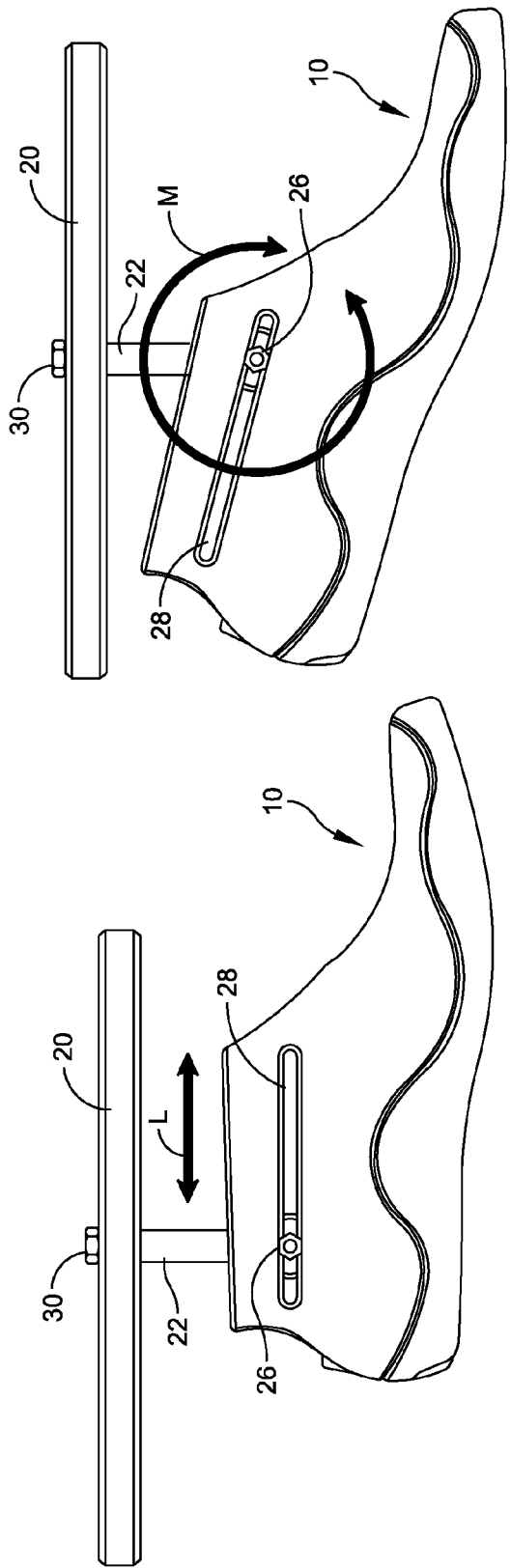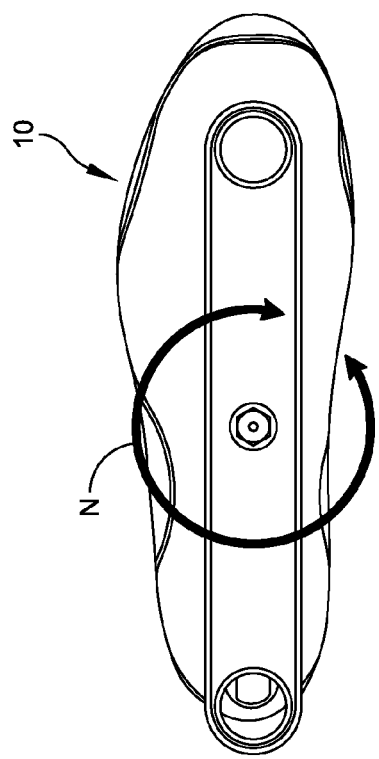
FIG. 4A
FIG. 4B
FIG. 4C

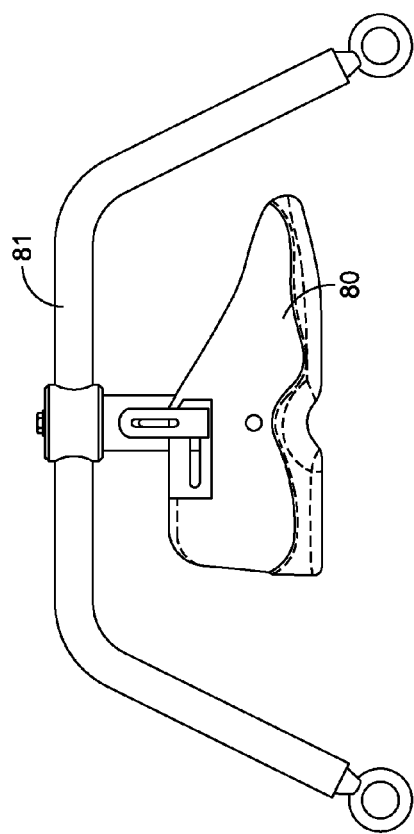
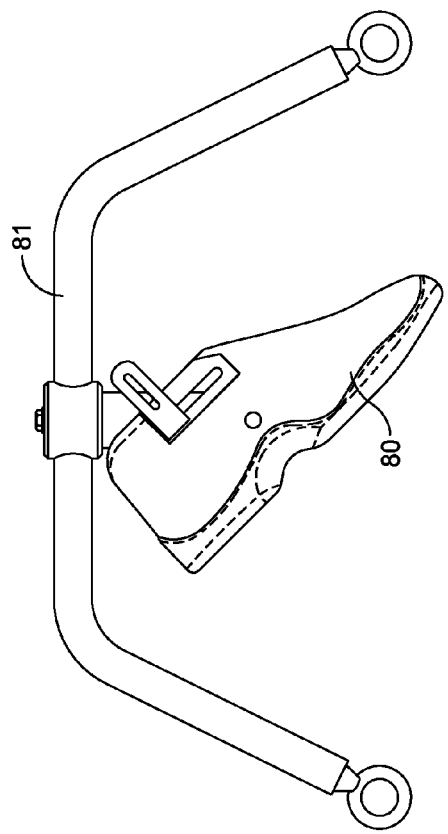
FIG. 7C
FIG. 7D

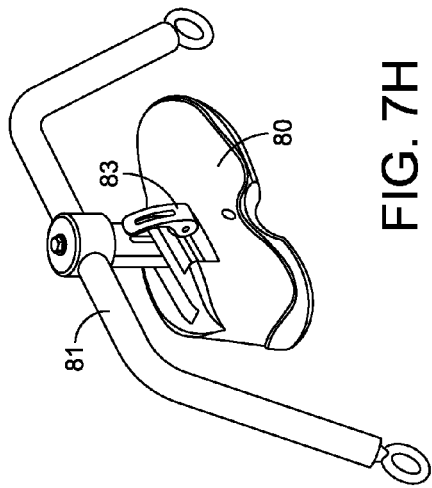
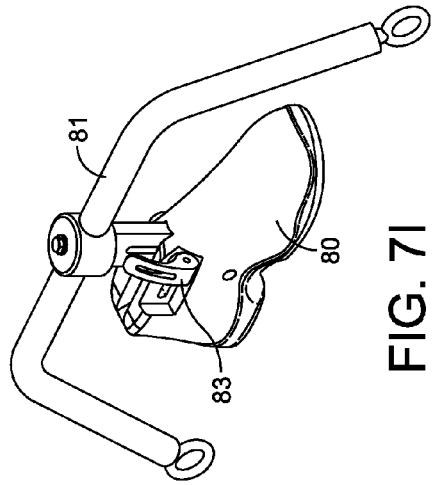
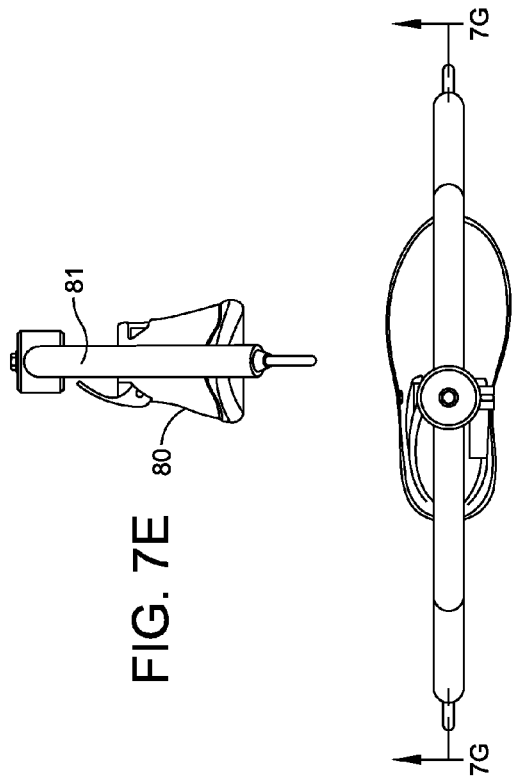
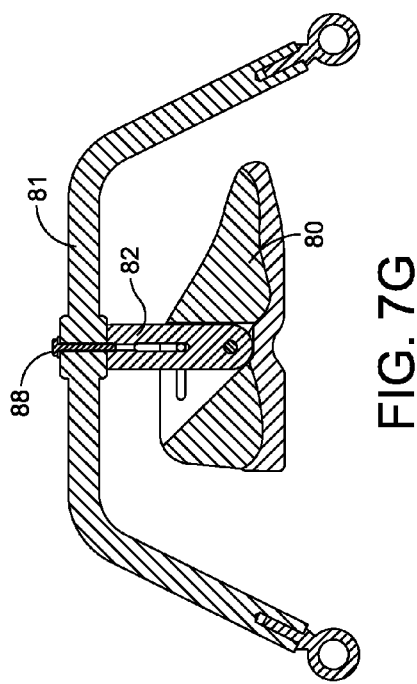

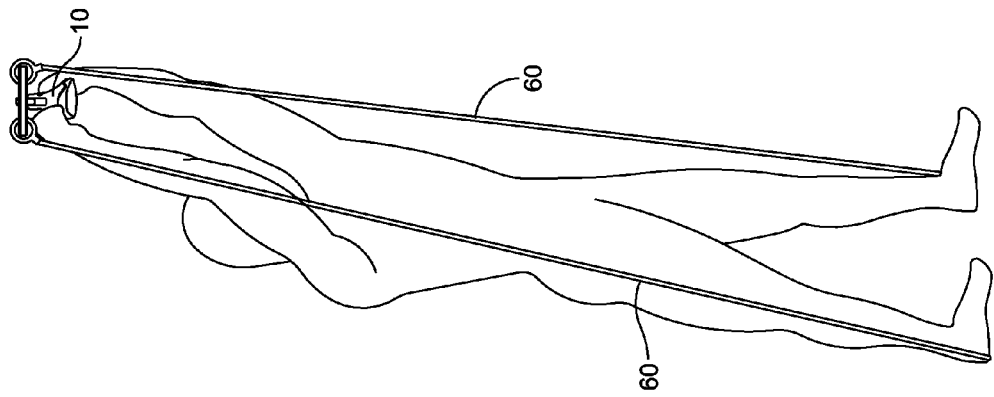
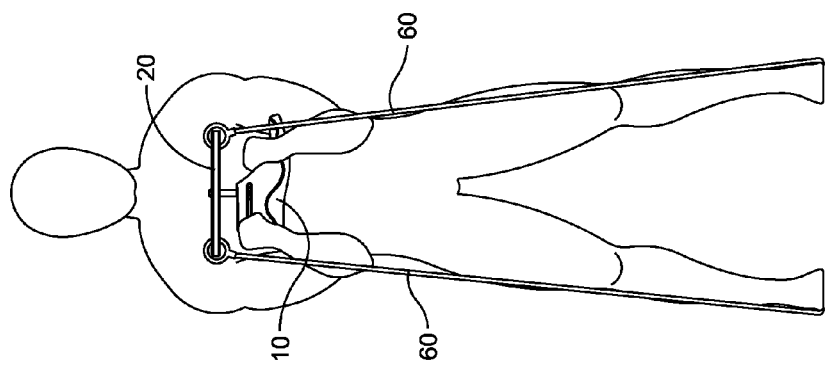
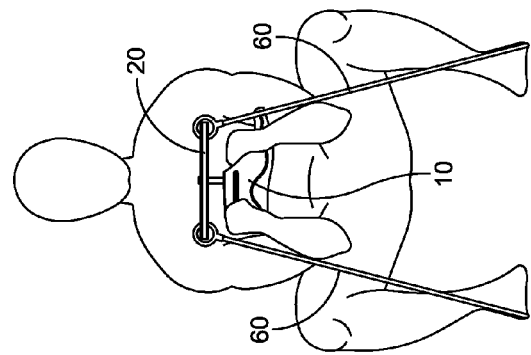
FIG. 8C
FIG. 8B
FIG. 8A

ATHLETIC TRAINING DEVICE

RELATED CASES

Priority for this application is hereby claimed under 35 U.S.C. §119(e) to commonly owned and U.S. Provisional Patent Application Ser. No. 61/816,976, which was filed on Apr. 29, 2013, and which is incorporated by reference herein in its entirety.

FIELD OF THE INVENTION

The present invention relates in general to an athletic training device and pertains more particularly, to an apparatus and associated technique for improving cheerleading moves.

BACKGROUND OF THE INVENTION

Cheerleading is a skillful sport that involves several different types of movements. For example, stunts are defined as building performances displaying a person's skill or dexterity. The stunts may range from basic 2-legged stunts to 1-legged extended stunts and even high-flying basket tosses. There are numerous variations of each stunt, including different entries and dismounts.

A review of the prior art indicates that there are several types of exercise apparatus that are associated with a shoe or sneaker. Refer, for example, to U.S. Pat. No. 4,596,387 to Roberts or U.S. Pat. No. 4,728,103 to Fulton. However, this exercise apparatus is associated with a shoe or sneaker that is actually worn by the user of the exercise equipment. Moreover, the existing prior art does not at all address any particular apparatus or device useful in improving cheerleading moves.

Accordingly, it is an object of the present invention to provide a device that is in particular adapted for improving cheerleading movements and that thus employs a base member of a shoe or sneaker form that is manipulated by the hands of the user.

Another object of the present invention is to provide an athletic training device that is particularly adapted for enhancing the power and strength of a "base" person.

Still another object of the present invention is to provide an athletic training device particularly adapted for the training of cheerleaders and important in reducing injuries associated, in particular, with "stunting."

SUMMARY OF THE INVENTION

To accomplish the foregoing and other objects, features and advantages of the present invention there is provided a training device that includes a base member having opposed sides that are for grasping by the hands of a user, a cross bar supported over the base member, a support post mounted from the base member at a lower end of the support post and for supporting the cross bar at an upper end of the support post, and a pair of cables separately attached at opposite ends of the cross bar.

In accordance with other aspects of the present invention there is provided a swivel joint at the upper end of the support post for supporting the cross bar from the support post and for swivel motion relative to the support post; the swivel joint enabling swiveling of the cross bar in a plane that is substantially parallel to a base surface of the base member; a pivot joint at the lower end of the support post for mounting the support post from the base member and for pivoting motion relative to the base member; the base member being in the form of a shoe or sneaker and having an elongated slot for receiving a bolt that supports the pivot joint; the elongated slot enabling linear motion of the support post and cross bar relative to the base member; the base member also having an upwardly facing channel in which the pivot joint resides; the cross bar may have a straight center section and opposed end angular sections, each end section having a means for attachment to the respective cables; and wherein the base member may be in the form of a shoe or sneaker that has a double shape with an upwardly facing channel between the double shape.

In accordance with still another version of the present invention there is provided a training device in combination with weight training equipment to which a set of cables are attached. The training device includes a base member having opposed sides that are for grasping by the hands of a user, a cross bar supported over the base member, a support post mounted from the base member at a lower end of the support post and for supporting the cross bar at an upper end of the support post, and wherein the set of cables from the weight training equipment are each separately attached at opposite ends of the cross bar.

In accordance with other aspects of the present invention there is provided a swivel joint at the upper end of the support post for supporting the cross bar from the support post and for swivel motion relative to the support post; a pivot joint at the lower end of the support post for mounting the support post from the base member and for pivoting motion relative to the base member; the base member being in the form of a shoe or sneaker and has an elongated slot for receiving a bolt that supports the pivot joint, and wherein the elongated slot enables linear motion of the support post and cross bar relative to the base member.

In accordance with still another version of the present invention there is provided a training device in combination with a set of cables that are attached at a fixed position at one end thereof. The training device includes a base member having opposed sides that are for grasping by the hands of a user, a cross bar supported over the base member, a support post mounted from the base member at a lower end of the support post and for supporting the cross bar at an upper end of the support post, and wherein the set of cables, at an opposed end thereof, are each separately attached at opposite ends of the cross bar.

In accordance with this last version of the present invention, other aspects include a swivel joint at the upper end of the support post for supporting the cross bar from the support post and for swivel motion relative to the support post; a pivot joint at the lower end of the support post for mounting the support post from the base member and for pivoting motion relative to the base member; the base member being in the form of a shoe or sneaker and has an elongated slot for receiving a bolt that supports the pivot joint, and wherein the elongated slot enables linear motion of the support post and cross bar relative to the base member.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which:

FIGS. 1A and 1B are respective plan and side elevation views of a first embodiment of the present invention;

FIGS. 2A-2C are illustrative perspective views of the embodiment illustrated in FIGS. 1A and 1B;

FIGS. 3A-3D are further illustrations of the embodiment illustrated in FIGS. 1 and 2 wherein FIG. 3A is a side elevation view, FIG. 3B is a front view, FIG. 3C is a top view, and FIG. 3D is a cross-sectional view taken along line 3D-3D;

FIGS. 4A-4C are diagrams of this first embodiment of the present invention also illustrating the various motions that can be accomplished in which FIG. 4A is a side elevation view, FIG. 4B is a side elevation view in a different position and FIG. 4C is a top view;

FIGS. 5A-5C illustrate a second embodiment of the present invention employing a double shoe or sneaker construction in which FIG. 5A is a perspective view, FIG. 5B is a front view and FIG. 5C is an exploded perspective view;

FIGS. 6A-6C illustrate other views of the embodiment illustrated in FIG. 5 in which FIG. 6A is a side elevation view, FIG. 6B is a top view, and FIG. 6C is a cross-sectional view taken along line 6C-6C of FIG. 6B;

FIGS. 7A-7I illustrate a third embodiment of the present invention in various views in which FIG. 7A is a front perspective view, FIG. 7B is an exploded front perspective view, FIG. 7C is a side elevation view, FIG. 7D is a side elevation view in a different position, FIG. 7E is a front view, FIG. 7F is a top view, FIG. 7G is a cross-sectional view taken along line 7G-7G of FIG. 7F, FIG. 7H is a rear perspective view, and FIG. 7I is a front perspective view; and FIGS. 8-11 are diagrams illustrating the use of the training device of the present invention, in which FIGS. 8A-8C represent a first exercise sequence, FIGS. 10-10C represent a first exercise sequence with an apparatus.

DETAILED DESCRIPTION

Figure 5C:
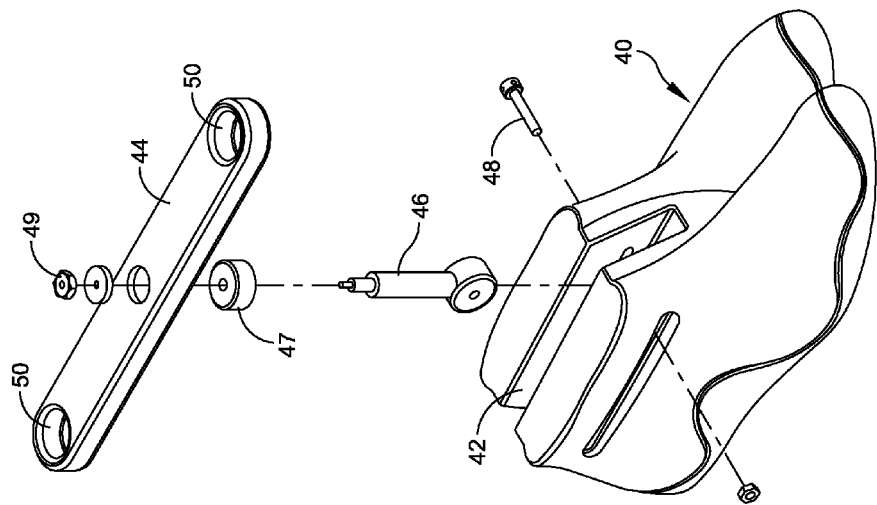

Reference is now made to the single shoe version of the present invention illustrated in FIGS. 1-4. This is illustrated by the shoe 10. This shoe or sneaker mimics the actual foot of the flier or person that is being lifted. The illustrations in FIGS. 8-11 are helpful in understanding the manner in which the shoe or base member is employed by the person so as to perform certain exercises and to thus improve the strength and agility of the base person.

The shoe 10 shown in FIGS. 1-4 preferably has a hard plastic or rubber sole 12, and an intermediate soft grip 16 (see FIGS. 2 and 3). The rear portion of the soft grip 16 may be provided with a finger grip 18 as illustrated in FIG. 2B. A similar finger grip may be provided (not shown) at the front of the shoe or sneaker construction. The shoe or sneaker construction 10 is also referred to herein as a base member.

The upper shell 14 is configured with opposed, upwardly-directed walls defining a channel 19. The channel 19 is for receiving retaining components that enable an interconnection between the shoe and cabling such as illustrated in FIGS. 8-11. These components such as shown in an exploded view in FIG. 2C, include a crossbar 20, a support post 22, bearing 24, and Allen bolt 26. The upright walls that define the channel 19 receive the base end 23 of the support post 22. The Allen bolt 26 with its associated locknut 27 retain the base 23 in place. The Allen bolt 26 is capable of sliding within opposed slots 28. The Allen bolt 26 passes through the circular support member 23. The top of the post 22 is engaged with the bearing 24 and is secured in place to the crossbar 20 by means of the locknut 30 and associated washer 31. The crossbar 20 is also provided with end holes 32. These represent eyelets for the attachment of cables Reference may now be made to FIGS. 4A-4C regarding the various motions regarding the various motions that are enabled by the particular apparatus disclosed. Arrow L shown in FIG. 4A represents a sliding linear motion when the bolt 26 is capable of sliding within the slots 28. In FIG. 4B the circular Arrow M represents a pivoting action at the base 23 of the support post. This action allows a pivoting, as illustrated in FIG. 4B of the base member relative to the support post 22. In the embodiment illustrated, this pivoting is basically between the base 23 of the support post and the bolt 26, although, other pivot arrangements may also be provided at that location. Thus, FIG. 4 illustrates the linear motion of the base member relative to the crossbar indicated by the Arrow L while FIG. 4B illustrates the pivoting motion of the base member relative to the support post and the crossbar as illustrated by the Arrow M. Lastly, FIG. 4C illustrates by circular Arrow N a rotation about the longitudinal axis of the support post 22. Again, this is a rotation between the crossbar and the shoe structure. This may be referred to as a swivel joint. Note the bearing 24 in FIG. 2C which can enable this swiveling motion between the crossbar 20 and the support post 22.

Figure 5A:
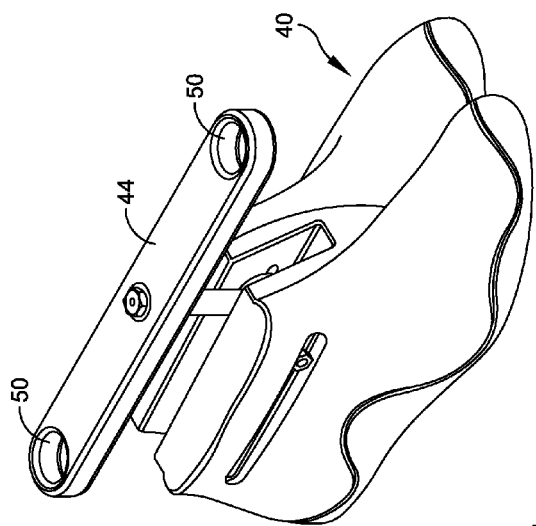
Figure 5B:
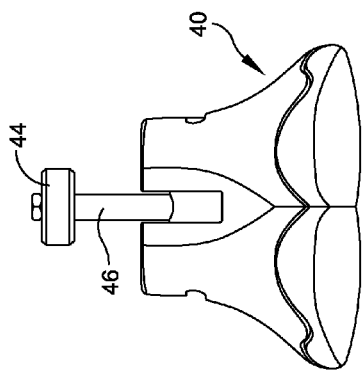
Figure 6B:
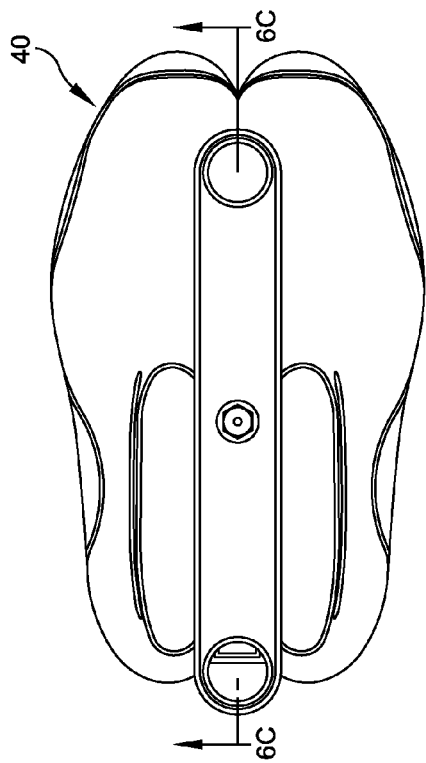
Figure 6C:
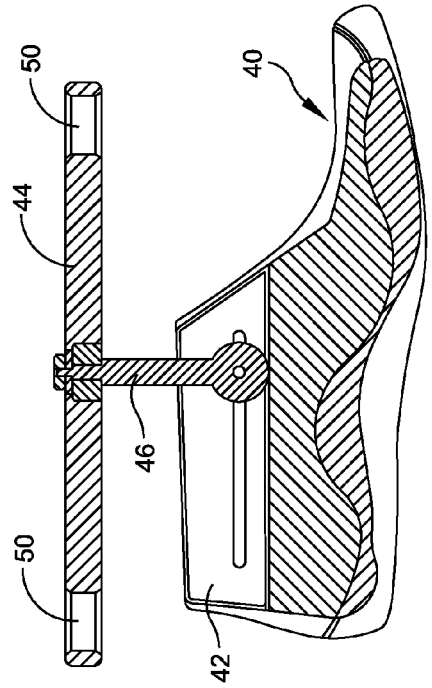
Figure 6A:
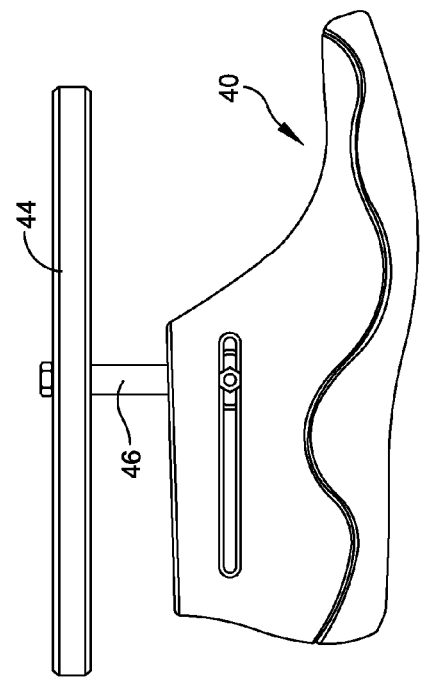

Reference is now made to FIGS. 5 and 6 for an embodiment that is similar to that described in FIGS. 1-4 but includes a double shoe construction illustrated at 40. In this particular embodiment there is a channel 42 disposed through the middle of the separate double shoe arrangement. The remainder of the apparatus is substantially the same as described in the first embodiment, thus including the crossbar 44, a pivot post 46, bearing 47, bolt 48, and a nut 49. These components, including the crossbar 44 and support post 46, function basically in the same manner as previously described in connection with the first embodiment described herein. Thus, in this embodiment the various degrees of freedom as explained in FIG. 4 also apply to this double shoe construction embodiment. Cabling can be connected at the end holes or eyelets 50 of the crossbar 44 in this embodiment.

Figure 7A:
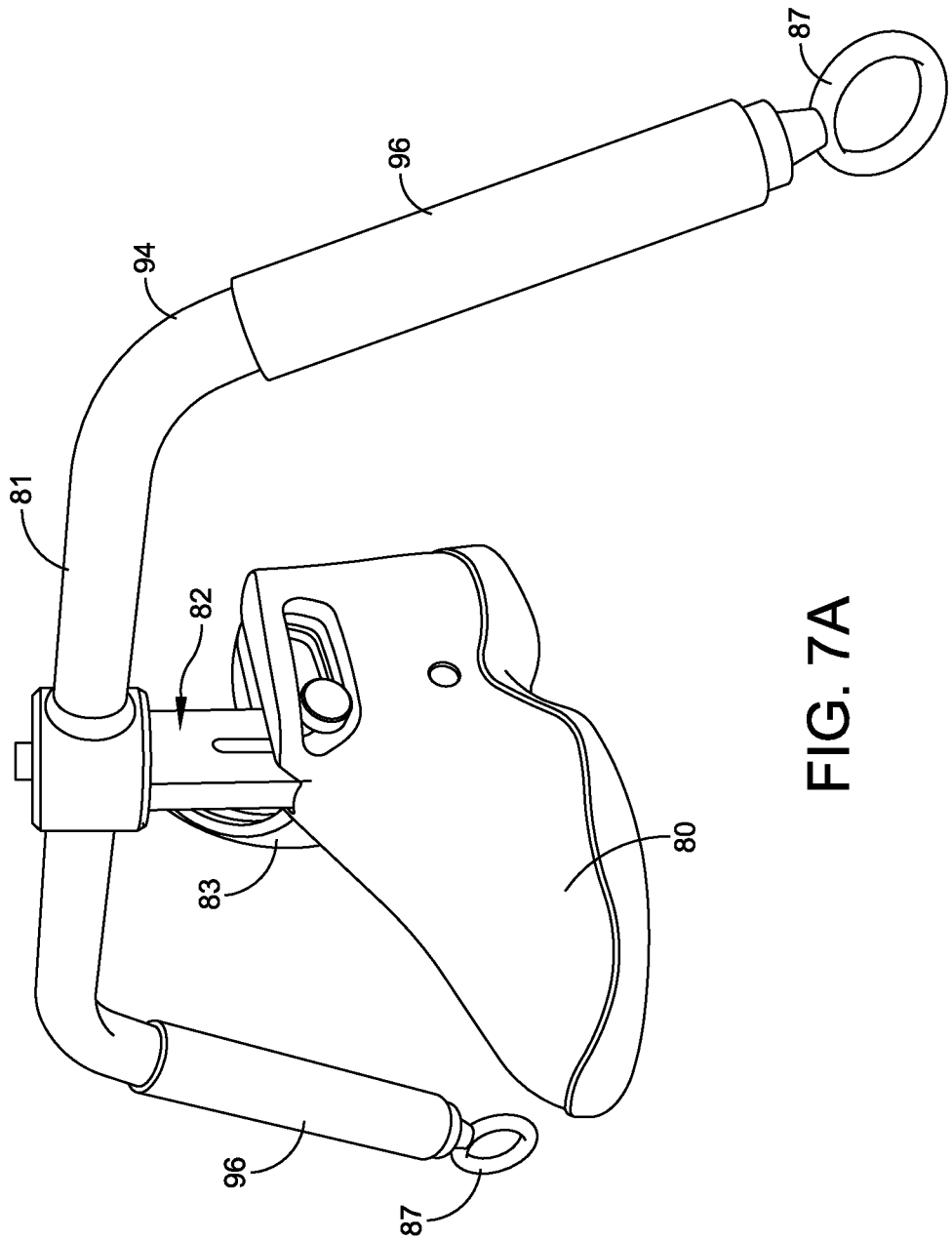
Figure 7B:
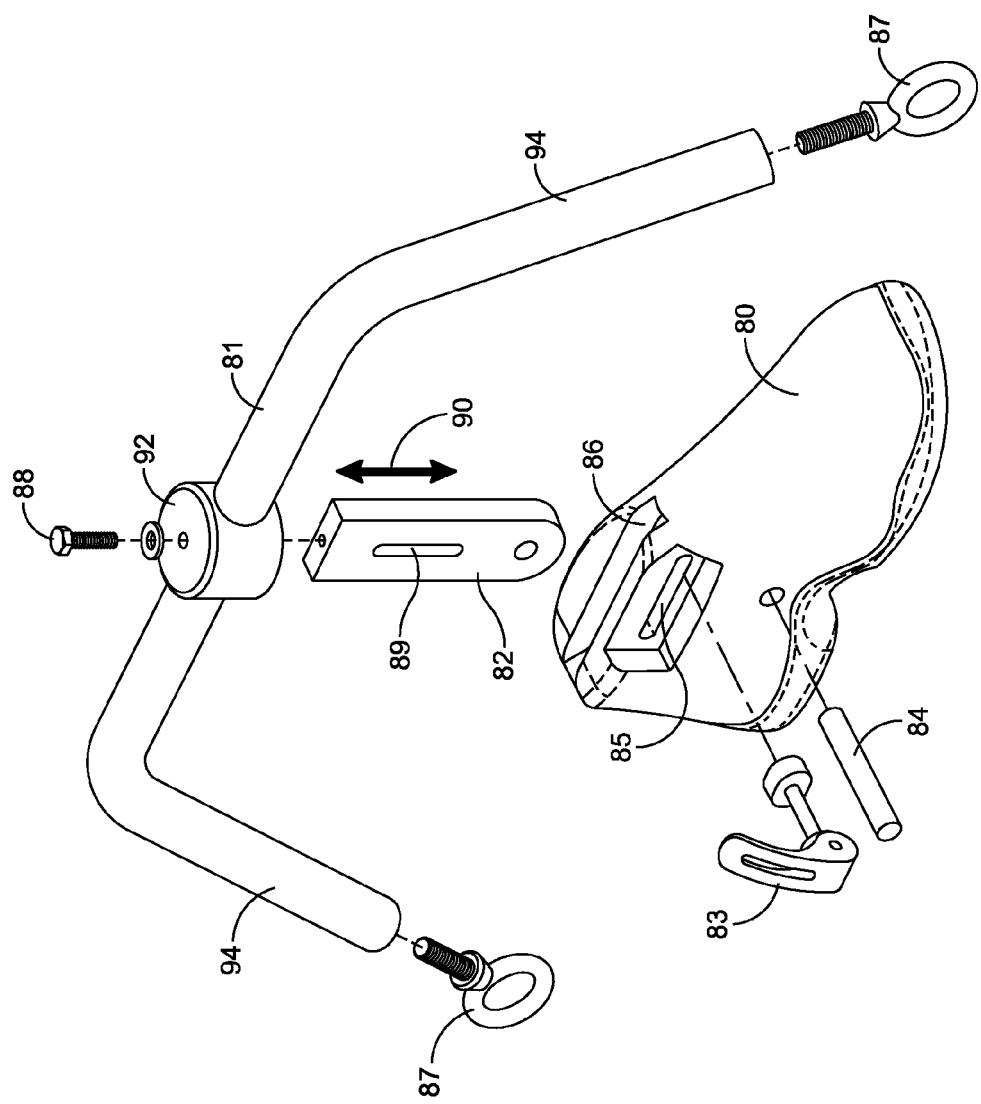

Reference is now made to a further embodiment of the present invention illustrated FIGS. 7A-7I. The mechanism illustrated in this embodiment, in many ways, is similar to that found in the previous embodiments described. The components illustrated in FIGS. 7A-7I include a base member 80 in a shoe or sneaker form, a support post 82, and the crossbar 81. The base member 80 is provided with upright walls that define the channel 86. The channel 86 receives the bottom end of the support post 82. A pin 84 may pass through the base member and through a lower hole in the support post 82 for securing the support post 82 with the base member 80. A latch 83 is also illustrated that may be a 2-piece member and that is adapted to fit within the opposed slots 85 in the aforementioned upright walls. The latch 83 includes a rod member that can transition linearly within the slots 85. The rod member also fits within an elongated slot 89 in the support post 82. This combination of the latch 83 and the slot in the support post enables a certain amount of adjustment between the base member 80 and the crossbar 81 in the direction of Arrow 90, such as illustrated in FIG. 7B. The latch 83 may be considered as having locked and unlocked positions. FIG. 7A shows the latch 83 in a locked position wherein the distance between the base member and the crossbar is fixed in position.

The crossbar 81 also preferably has a straight section at its top that extends on either side of a hub 92. FIG. 7B illustrates the support post 82 secured to the hub 92 by means of a screw 88. The crossbar 81 also has angularly and downwardly extending ends 94. Each of these ends has a free end receives and secures thereto the respective eyelets 87. FIG. 7A shows the eyelets 87 in place. FIG. 7A also shows the optional use of a resilient tubular handle member 96.

Figure 9C:
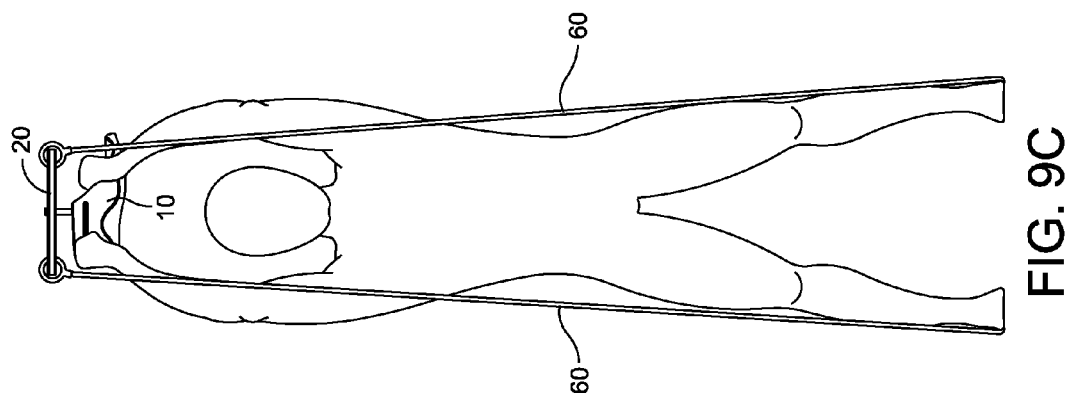
FIGS. 9A-9C represent a second exercise sequence.
Figure 9B:
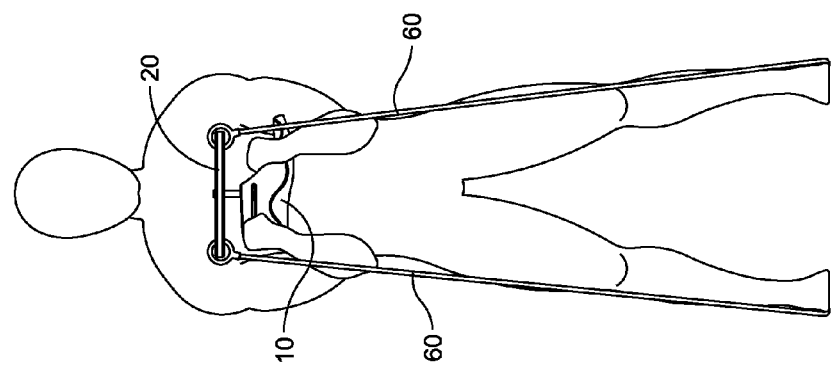
Figure 9A:
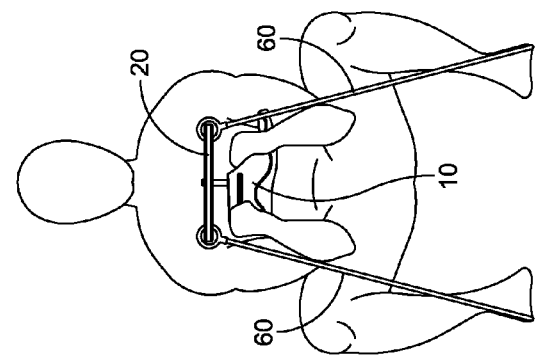
Figure 10C:
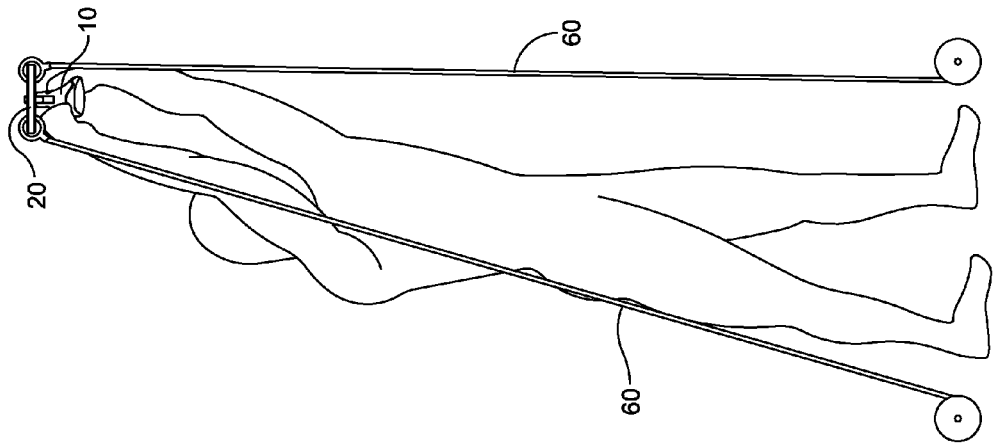
Figure 10B:
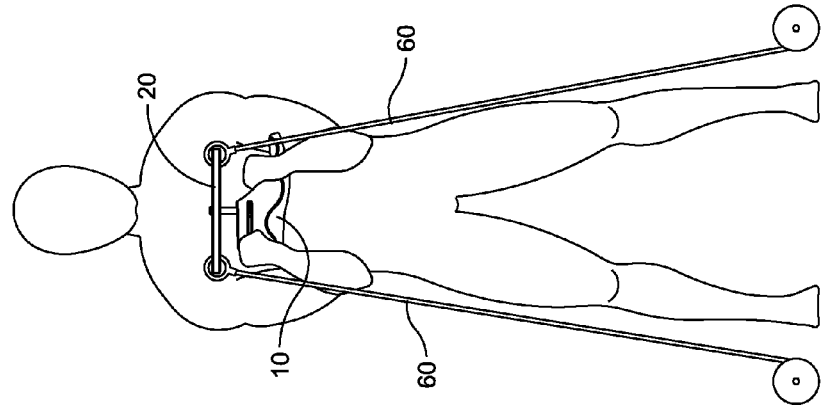
Figure 10A:
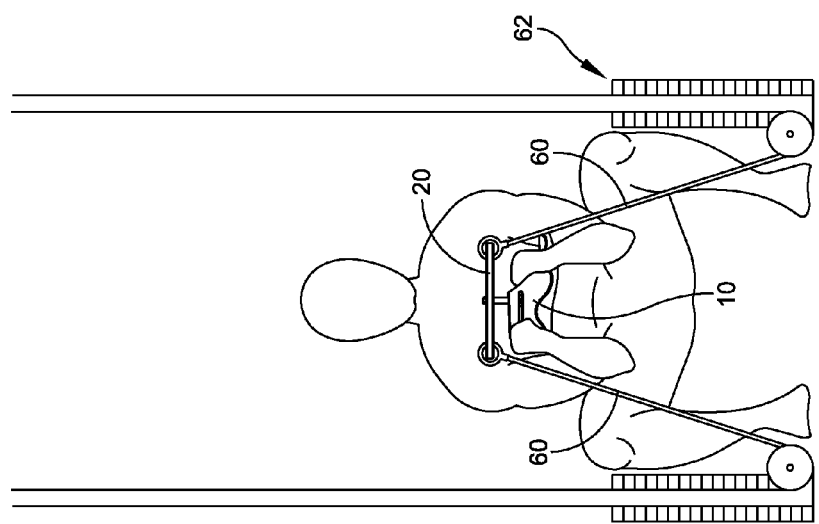
Figure 11A:
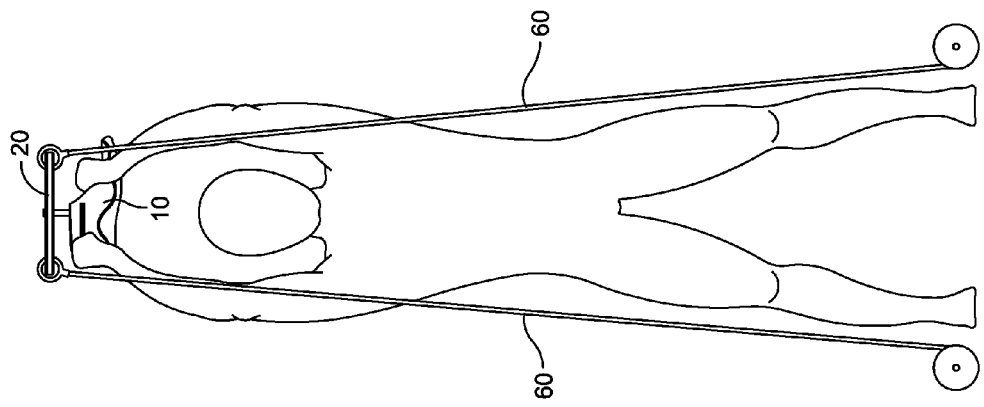
FIGS. 11A-11C illustrate a second exercise sequence with the apparatus.
Figure 11B:
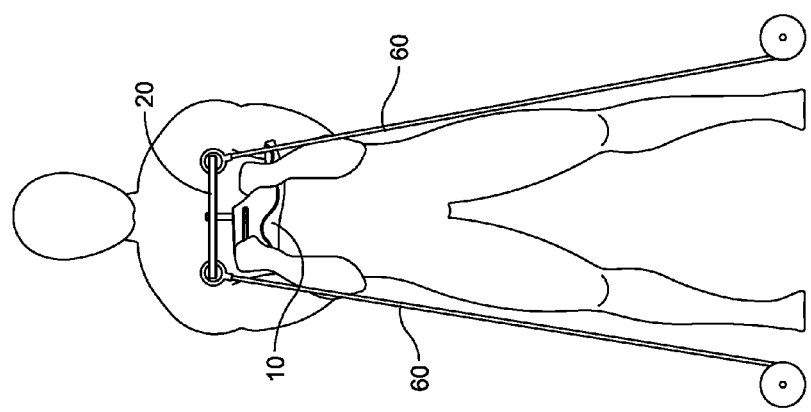
Figure 11C:
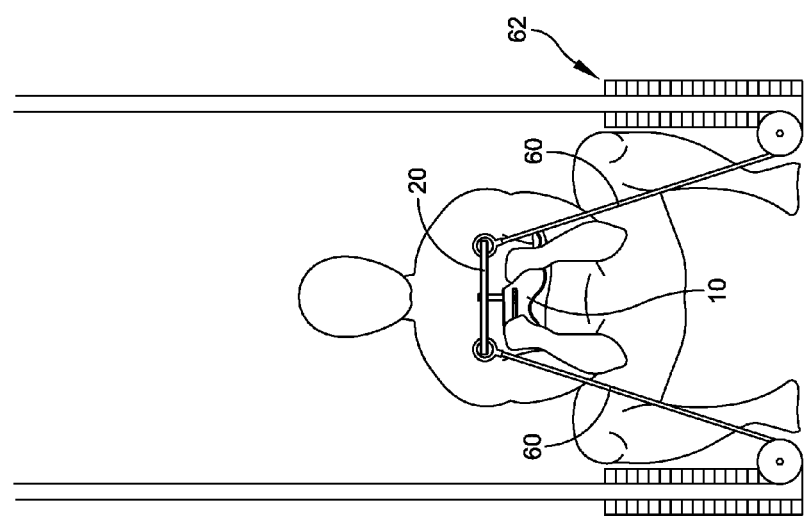

Reference is now made to FIGS. 8-11. FIGS. 8 and 9 illustrated the base member or shoe form of the present invention as used with cables 60. FIGS. 10 and 11 show the use of cables or tubes 60 as associated with a functional trainer schematically illustrated at 62.

In FIGS. 8 and 9 the Reference No. 60 may denote cabling or other types of tension members including tubing. The tubing may be secured about the foot such as with the use of Velcro securing members. Alternatively, the tubing may be fixed to the floor or may be wrapped about or suitably attached to any other sturdy and fixed object. The various positions illustrated in FIGS. 8 and 9 show different positions that can be attained. In all of these positions the user grasps the shoe 10 at either side thereof and holds the shoe in place, preferably using one or more of the finger grips. For example, in FIG. 8, the user is shown in a first position stooped down; is shown in a more upright position with the shoe at about chest level; and is furthermore shown with the shoe stretched outwardly and upwardly. These various positions would simulate the positions used in cheerleading movements.

Reference is now made to the schematic diagrams in FIGS. 10 and 11. These illustrations show positions substantially the same as previously illustrated in FIGS. 8 and 9. Again, in any one of these illustrations there are shown three separate positions to show the full motion of use. Again, in this embodiment the shoe is also grasped between the two hands of the user. This provides an improved technique in cheerleading movements, which in turn will reduce injuries that are associated in particular with stunting moves in cheerleading. The apparatus of the present invention also is useful for other sports, such as in aerobatics or in military applications. For example, these moves could simulate moves such as throwing someone over a wall without needing a second person to be involved.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A training device comprising:
    a base member having opposed sides that are for grasping by the hands of a user;
    an elongated cross bar supported over the base member and having opposed ends;
    a single support post mounted from the base member at a lower end of the support post and for supporting the elongated cross bar at an upper end of the support post at a position intermediate the opposed ends of the elongated cross bar;
    a swivel joint at the upper end of the support post for supporting the cross bar from the support post, for providing a swivel motion relative to the support post and constructed and arranged to have a swivel axis that extends in a direction between the base member and the elongated cross bar,
    a pivot joint at the lower end of the support post for pivotally mounting the support post relative to the base member, for providing a pivoting motion relative to the base member and constructed and arranged to have a pivot axis that extends substantially orthogonal to the swivel axis;
    a pair of cables separately attached at the opposed ends of the elongated cross bar;
    wherein the base member has an elongated slot that extends in a direction that is substantially orthogonal to the pivot axis;
    wherein the pivot joint includes a pivot joint bolt at the lower end of the support post for mounting the support post from the base member; and
    wherein the pivot joint bolt extends through the elongated slot in the base member to support the pivot joint relative to the base member.

2. The training device of claim 1 wherein the swivel joint is disposed between the single support post and the elongated cross bar.

3. The training device of claim 2 wherein the swivel joint enables swiveling of the elongated cross bar in a plane that is substantially parallel to a base surface of the base member.

4. The training device of claim 3 wherein the base member is in the form of a shoe or sneaker.

5. The training device of claim 4 wherein the elongated slot enables linear motion of the support post and the elongated cross bar relative to the base member.

6. The training device of claim 5 wherein the base member also has an upwardly facing channel in which the pivot joint resides.

7. The training device of claim 1 wherein the base member has spaced apart walls defining a channel therebetween for receiving the pivot joint.

8. The training device of claim 7 wherein the base member is in the form of a shoe or sneaker.

9. The training device of claim 1 wherein the cross bar has a straight center section and opposed end angular sections, each end angular section for attachment to the respective cables.

10. The training device of claim 1 wherein the base member is in the form of a shoe or sneaker that has a double shape with an upwardly facing channel between the double shape.

11. A training device in combination with weight training equipment to which a set of cables are attached, said training device comprising a base member having opposed sides that are for grasping by the hands of a user, a cross bar supported over the base member, a support post mounted from the base member at a lower end of the support post and for supporting the cross bar at an upper end of the support post at a position intermediate opposed ends of the cross bar, a swivel joint at the upper end of the support post for supporting the cross bar from the support post, for providing a swivel motion relative to the support post and constructed and arranged to have a swivel axis that extends in a direction between the base member and the elongated cross bar, a pivot joint at the lower end of the support post for pivotally mounting the support post relative to the base member, for providing a pivoting motion relative to the base member and constructed and arranged to have a pivot axis that extends substantially orthogonal to the swivel axis, wherein the set of cables from the weight training equipment are each separately attached at the opposed opposite ends of the cross bar;
    wherein the base member has an elongated slot that extends in a direction that is substantially orthogonal to the pivot axis;
    wherein the pivot joint includes a pivot joint bolt at the lower end of the support post for mounting the support post from the base member; and
    wherein the pivot joint bolt extends through the elongated slot in the base member to support the pivot joint relative to the base member.

12. The training device of claim 11 wherein the swivel joint is disposed between the support post and the cross bar.

13. The training device of claim 12 wherein base member has spaced apart walls defining a channel therebetween for receiving the pivot joint.

14. A training device in combination with a set of cables that are attached at a fixed position at one end thereof, said training device comprising a base member having opposed sides that are for grasping by the hands of a user, a cross bar supported over the base member, a support post mounted from the base member at a lower end of the support post and for supporting the cross bar at an upper end of the support post at a position intermediate opposed ends of the cross bar, a swivel joint at the upper end of the support post for supporting the cross bar from the support post, for providing a swivel motion relative to the support post and constructed and arranged to have a swivel axis that extends in a direction between the base member and the elongated cross bar, a pivot joint at the lower end of the support post for pivotally mounting the support post relative to the base member, for providing a pivoting motion relative to the base member and constructed and arranged to have a pivot axis that extends substantially orthogonal to the swivel axis, wherein the set of cables, at an opposed end thereof, are each separately attached at the opposed ends of the cross bar;

wherein the base member has an elongated slot that extends in a direction that is substantially orthogonal to the pivot axis;

wherein the pivot joint includes a pivot joint bolt at the lower end of the support post for mounting the support post from the base member; and wherein the pivot joint bolt extends through the elongated slot in the base member to support the pivot joint relative to the base member.

15. The training device of claim 14 wherein the swivel joint is disposed between the support post and the cross bar.

16. The training device of claim 15 wherein the base member has spaced apart walls defining a channel therebetween for receiving the pivot joint.

\* \* \* \* \*